June 13, 1950     R. J. OLANDER     2,511,173
FRICTION SHOCK ABSORBER FOR RAILWAY CAR TRUCKS
Filed May 22, 1948     2 Sheets-Sheet 1
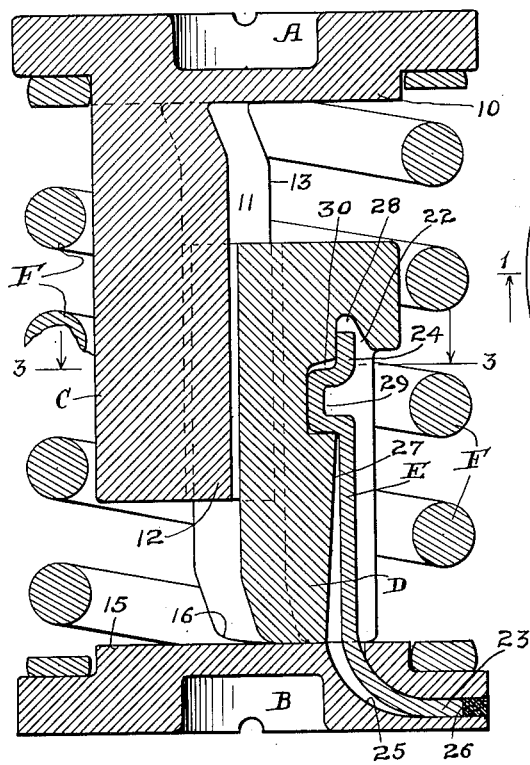
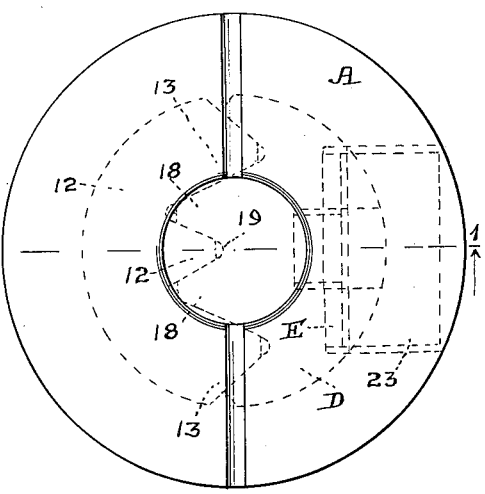
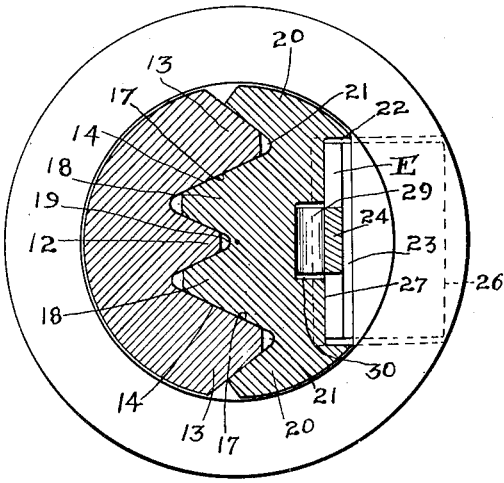
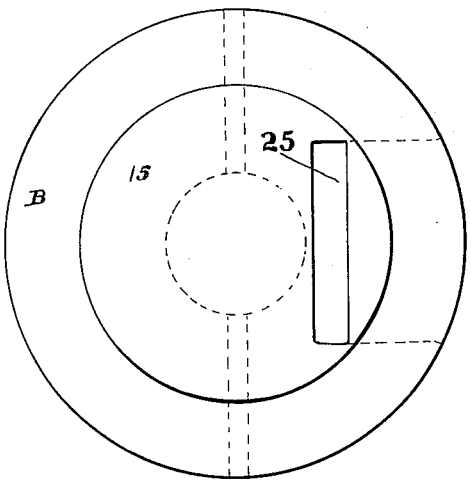
Inventor:
Roland J. Olander.
By Henry Fuchs.
Atty.

June 13, 1950  R. J. OLANDER  2,511,173
FRICTION SHOCK ABSORBER FOR RAILWAY CAR TRUCKS
Filed May 22, 1948  2 Sheets-Sheet 2
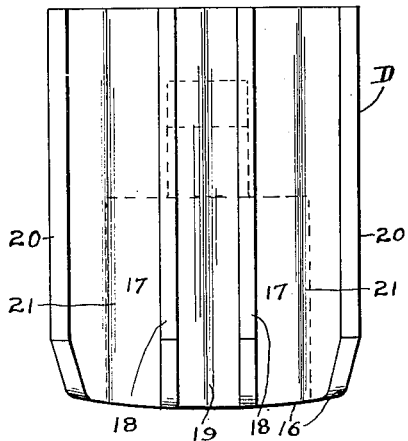
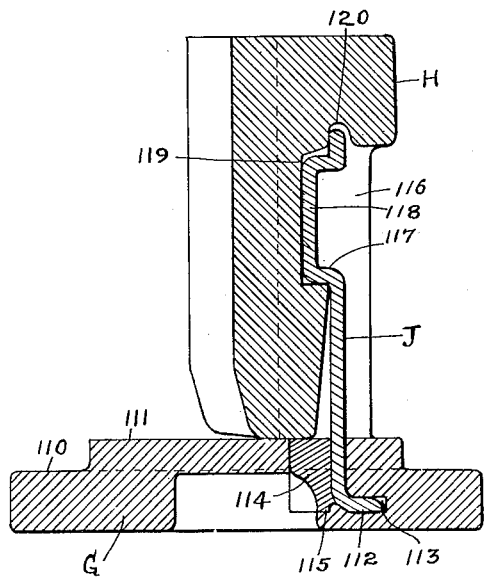
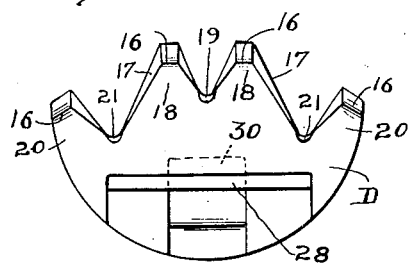
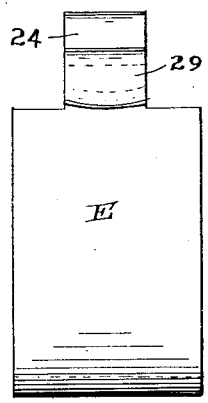
Inventor:
Roland J. Olander.
By Henry Fuchs.
Atty.

Patented June 13, 1950

2,511,173

UNITED STATES PATENT OFFICE 2,511,173

FRICTION SHOCK ABSORBER FOR RAILWAY CAR TRUCKS

Roland J. Olander, Chicago, Ill., assignor to W. H. Miner, Inc., Chicago, Ill., a corporation of Delaware Application May 22, 1948, Serial No. 28,617

7 Claims. (Cl. 267—9)

1

This invention relates to improvements in friction shock absorbers, especially adapted for use in connection with truck springs of railway cars for snubbing the action of the springs.

One object of the invention is to provide an efficient friction shock absorber of simple design, comprising a friction post and a cooperating friction shoe, relatively slidable lengthwise with respect to each other, wherein the shoe is held in frictional engagement with the post by a spring element urging the shoe against the post.

A further object of the invention is to provide a mechanism as set forth in the preceding paragraph, wherein the engaging friction surfaces of the post and shoe are of interengaging guiding tongue and groove formation to prevent relative lateral displacement of the post and shoe with respect to each other.

Other objects of the invention will more clearly appear from the description and claims hereinafter following.

In the accompanying drawings forming a part of this specification, Figure 1 is a central, transverse, vertical sectional view of my improved shock absorber, the section being taken on the line 1—1 of Figure 2. Figure 2 is a top plan view of Figure 1. Figure 3 is a transverse, horizontal sectional view, corresponding substantially to the line 3—3 of Figure 1, with the spring omitted. Figure 4 is a top plan view of the bottom follower plate shown in Figure 1. Figure 5 is an elevational view of the friction shoe shown in Figure 1, looking from left to right in said figure. Figure 6 is a bottom plan view of Figure 5, looking upwardly in said figure. Figure 7 is an elevational view of the plate spring shown in Figure 1, looking from left to right in said figure. Figure 8 is a view, similar to Figure 1, of the lower follower and friction shoe, illustrating another embodiment of the invention.

Referring first to the embodiment of the invention illustrated in Figures 1 to 7 inclusive, my improved shock absorber comprises broadly a pair of relatively movable top and bottom followers A and B, a friction post C integral with the top follower, a friction shoe D movable with the bottom follower, a plate spring E pressing the shoe D against the post, and a coil spring F surrounding the post and shoe and yieldingly resisting relative movement of the post and shoe in lengthwise direction toward each other.

The top follower A is in the form of a circular disclike plate having the post C depending therefrom, and formed integral therewith. At its lower side, the follower A is provided with a cylindrical boss 10 of smaller diameter than the follower, in the form of a base member for the post. The post C is disposed to one side of the central vertical axis of the device and is provided with a lengthwise extending friction surface 11 on its inner side of serrated or V-shaped tongue and groove formation, comprising a longitudinally extending, central tongue or rib 12 of V-shaped, transverse section, and a pair of longitudinally extending tongues or ribs 13—13 of V-shaped, transverse section at opposite sides of the rib 12. The ribs 13—13 are preferably of greater elevation than the rib 12. The spaces between the rib 12 and the ribs 13—13 provide grooves 14—14 of V-shaped, transverse section.

The bottom follower B is also in the form of a cylindrical disc and is provided with an upstanding, cylindrical boss 15.

The friction shoe D is in the form of a block or relatively heavy plate, supported at its lower end on the boss 15 of the follower B. The bottom end face of the shoe D is preferably rounded at the inner side of the shoe, as indicated at 16, to facilitate slight rocking of said shoe on its base. On the inner side, the shoe D presents a longitudinally extending friction surface 17 of tongue and groove formation, adapted to interfit with the serrated surface of the post C. The surface 17 is formed by a pair of longitudinally extending tongues or ribs 18—18 of V-shaped, transverse cross section, having a groove 19 of V-shaped, transverse section therebetween, and a pair of tongues or ribs 20—20 at opposite sides of the ribs 18—18, the spaces between the ribs 20—20 and 18—18 providing groves 21—21 of V-shaped, transverse section. The ribs 18—18 engage over the rib 12 of the post C and have sliding fits in the grooves 14—14 at opposite sides of the rib 12, and the ribs 13—13 of the post C have sliding fits within the grooves 21—21 of the shoe D and engage the outer sides of the ribs 18—18 of said shoe. As will be evident, the post and shoe thus present interengaged serrated friction surfaces of tongue and groove formation which guide these parts and prevent lateral displacement of the shoe with respect to the post. At the outer side, that is, the right hand side thereof, as shown in Figure 1, the shoe is provided with an elongated opening or pocket 22, adapted to accommodate the upper portion of the plate spring E.

The plate spring E is in the form of an elongated, rectangular member, bowed or bent outwardly at its lower end, as indicated at 23, and provided with an upstanding tongue 24 at its upper end.

The lower curved end 23 of the plate spring E is engaged in a curved opening or seat 25 in the bottom follower B and is fixedly secured to the latter by being welded thereto, as indicated at 26. The main body portion of the plate spring E extends substantially vertically and is accommodated in the opening or pocket 22 of the shoe D, having its upper end bearing against the inner wall 27 of the pocket 22 of the shoe to press the shoe against the post C. The tongue 24 of the plate E serves to anchor the same to the shoe, said tongue having its upper end engaged in a groove 28 at the upper end of the pocket 22 and being provided with a laterally offset portion 29, inwardly of the end thereof, providing a retaining lug, which is engaged in a depression or seat 30 in the back wall of the pocket 22.

The spring F, which comprises a relatively heavy single coil, surrounds the post C and the shoe D and bears at its top and bottom ends on the followers A and B, respectively. The spring F is preferably under initial compression and yieldingly resists relative approach of the followers A and B.

The improved shock absorber preferably replaces one of the spring units of a truck spring cluster; however, several of the improved shock absorbers may be employed in a single cluster of springs, replacing two or more units of the same.

The operation of my improved shock absorber, illustrated in Figures 1 to 7 inclusive, is as follows: Upon the spring cluster of the truck of a railway car being compressed between the spring follower plates of said cluster, the improved shock absorber is compressed therewith between said follower plates, forcing the follower A and the post C and the follower B and the friction shoe D toward each other, lengthwise of the mechanism against the resistance of the spring F, thereby effecting sliding movement between the friction post C and shoe D, the shoe D being forced into frictional engagement with the post by the plate spring E.

As the spring follower plates of the truck springs are separated, due to recoil of said springs, the followers A and B and the post C and the shoe D are moved apart lengthwise by the expansive action of the spring F, thereby restoring the parts to the normal full release position shown in Figure 1.

As will be evident, the frictional resistance of the device is substantially constant, being produced by the sliding action of the spring pressed friction shoe D on the post C. The action of the truck springs is thus effectively snubbed during both compression and expansion of the improved shock absorber.

Referring next to the embodiment of the invention shown in Figure 8, it is pointed out that the same illustrates a modification of the bottom follower and friction shoe, which may be employed in place of the follower B and the friction shoe D hereinbefore described. The structure illustrated in Figure 8 comprises a bottom follower G in the form of a circular disc 110, having an upstanding central boss 111 on which a friction shoe H, similar to the shoe D, is supported. The shoe H is pressed against the cooperating friction post by a plate spring J having its lower end fixed to the follower and its upper end anchored to the shoe H. The plate spring J has its bottom end bent at right angles, as indicated at 112, and is engaged in a seat 113 in the follower G, said angular bent end being fixed in position by a locking block 114, seated in a pocket 115 adjacent said opening and engaging the lower end portion of the vertical section of the spring to clamp the same against the side wall of said pocket. The straight portion of the plate spring J is accommodated in an opening or pocket 116 in the side of the shoe H and is anchored to the shoe in a manner similar to the plate spring E, being provided with a lug 117 at its upper end having an offset portion 118 engaged in a seat 119 in the back wall of the pocket 116, and having its upper end portion extending into a slot 120.

I claim:

1. In a friction shock absorber, the combination with a friction post having a follower member at its outer end; of a second follower; a friction shoe carried by said second follower, said follower members being relatively movable toward and away from each other, said post and shoe having lengthwise sliding engagement with each other; a plate spring fixed to said second named follower and bearing on said shoe to force the same laterally against the post; and a spring surrounding said post and shoe and bearing at opposite ends on said follower member and follower, respectively, to yieldingly resist relative approach of the same, said last named spring having shouldered engagement with said followers to hold the same against displacement with respect to each other laterally of the mechanism.

2. In a friction shock absorber, the combination with a friction post; of a friction shoe, said post and shoe being in frictional contact with each other and movable with respect to each other lengthwise of the mechanism; a follower at the outer end of the post rigid therewith; a second follower on which the outer end of said shoe bears; a plate spring fixed to said second named follower and engaging the shoe to press the same against said post; and spring means bearing at opposite ends on said followers, respectively, and yieldingly opposing relative movement thereof toward each other, said spring means having shouldered engagement with said followers to hold the same against displacement with respect to each other laterally of the mechanism.

3. In a friction shock absorber, the combination with a pair of followers at opposite ends of the mechanism; of a friction post rigid with one of said followers and projecting toward the other follower; a friction shoe slidable lengthwise on said post, said shoe bearing at its outer end on said last named follower; a plate spring fixed at one end to said last named follower and anchored at its other end to said shoe, said plate spring pressing said shoe against the post; and spring means yieldingly opposing relative movement of said followers toward each other, said spring means having shouldered engagement with said followers to hold the same against displacement with respect to each other laterally of the mechanism.

4. In a friction shock absorber, the combination with a friction post at one end of the mechanism, said post having a follower member at its outer end rigid therewith; of a follower at the other end of the mechanism, said post and second named follower being movable toward and away from each other lengthwise of the mechanism; a friction shoe in lengthwise sliding frictional engagement with the post, said shoe bearing at its outer end on said second named follower; a plate spring rigidly secured to said second named follower and having a section extending lengthwise of said shoe and anchored to the same, said spring having bearing engagement at its outer end with the shoe to press the same against the post; and spring means yieldingly opposing relative approach of said follower member and follower, said spring means having shouldered engagement with said follower member and follower to hold the same against displacement with respect to each other laterally of the mechanism.

5. In a friction shock absorber, the combination with top and bottom followers; of a depending friction post on said top follower rigid therewith; an elongated friction shoe resting on said bottom follower, said shoe having sliding engagement with the post; a plate spring fixed to said bottom follower and upstanding therefrom, said plate spring having the upper end portion thereof in lateral bearing engagement with said shoe to press the same against said post; and spring means yieldingly opposing relative approach of said top and bottom followers, said spring means having shouldered engagement with said followers to hold the same against displacement with respect to each other laterally of the mechanism.

6. In a friction shock absorber, the combination with a friction post having a follower member at its outer end; of a second follower; a friction shoe carried by said second follower, said follower members being relatively movable toward and away from each other, said post and shoe having lengthwise sliding engagement with each other on interengaging friction surfaces of tongue and groove formation; a plate spring fixed to said second named follower and bearing on said shoe to force the same laterally against the post; and a spring surrounding said post and shoe and bearing at opposite ends on said follower member and follower, respectively, to yieldingly resist relative approach of the same, said last named spring having shouldered engagement with said follower member and follower to hold the same against displacement with respect to each other laterally of the mechanism.

7. In a friction shock absorber, the combination with a friction post having a follower member at its outer end; of a second follower; a friction shoe carried by said second follower, said follower members being relatively movable toward and away from each other, said post and shoe having lengthwise sliding engagement with each other on lengthwise extending, interengaging friction surfaces of V-shaped, transverse cross section; a plate spring fixed to said second named follower and bearing on said shoe to force the same laterally against the post; and a spring surrounding said post and shoe and bearing at opposite ends on said follower member and follower, respectively, to yieldingly resist relative approach of the same, said last named spring having shouldered engagement with said follower member and follower to hold the same against displacement with respect to each other laterally of the mechanism.

ROLAND J. OLANDER.

REFERENCES CITED

The following references are of record in the file of this patent:

UNITED STATES PATENTS

| Number | Name | Date |
| --- | --- | --- |
| 2,388,230 | Light | Oct. 30, 1945 |
| 2,410,165 | Johnson et al. | Oct. 29, 1946 |
| 2,416,691 | Haseltine | Mar. 4, 1947 |
| 2,439,937 | Krob | Apr. 20, 1948 |
| 2,444,989 | Haseltine | July 13, 1948 |